(12) United States Patent
Wang et al.

(10) Patent No.: US 10,803,596 B2
(45) Date of Patent: Oct. 13, 2020

(54) FULLY AUTOMATED ALPHA MATTING FOR VIRTUAL REALITY SYSTEMS

(71) Applicant: HypeVR, San Diego, CA (US)

(72) Inventors: Xiran Wang, West Lafayette, IN (US); Stanley Chan, West Lafayette, IN (US); Jason Juang, San Diego, CA (US)

(73) Assignee: HypeVR, San Diego, CA (US)

( * ) Notice: Subject to any disclaimer, the term of this patent is extended or adjusted under 35 U.S.C. 154(b) by 80 days.

(21) Appl. No.: 16/260,981

(22) Filed: Jan. 29, 2019

(65) Prior Publication Data
US 2019/0236788 A1    Aug. 1, 2019

Related U.S. Application Data

(60) Provisional application No. 62/623,088, filed on Jan. 29, 2018, provisional application No. 62/797,809, filed on Jan. 28, 2019.

(51) Int. Cl.
| | |
|---|---|
| *G06T 7/194* | (2017.01) |
| *G06T 7/13* | (2017.01) |
| *G06T 5/00* | (2006.01) |
| *G06T 7/90* | (2017.01) |

(52) U.S. Cl.
CPC ............. *G06T 7/194* (2017.01); *G06T 5/002* (2013.01); *G06T 7/13* (2017.01); *G06T 7/90* (2017.01); *G06T 2207/10016* (2013.01); *G06T 2207/20076* (2013.01); *G06T 2207/20192* (2013.01)

(58) Field of Classification Search
CPC ... G06T 7/11; G06T 7/12; G06T 7/174; G06T 5/002; G06T 7/194; G06T 7/143; G06T 7/13; G06T 7/90; G06T 2207/10016; G06T 2207/20076; G06T 2207/30196; G06T 2207/10024; G06T 2207/20192
See application file for complete search history.

(56) References Cited

U.S. PATENT DOCUMENTS

| | | | |
|---|---|---|---|
| 2012/0023456 A1* | 1/2012 | Sun ........................ | G06T 7/11 715/863 |
| 2014/0307056 A1* | 10/2014 | Collet Romea .......... | G06K 9/38 348/47 |
| 2016/0180199 A1* | 6/2016 | Yu .......................... | G06K 9/621 382/160 |
| 2016/0364877 A1* | 12/2016 | Kim ......................... | G06T 7/11 |
| 2017/0278246 A1* | 9/2017 | Kim ...................... | G06K 9/4652 |

OTHER PUBLICATIONS

S. Singh, A. S. Jalal and C. Bhatanagar, "Automatic trimap and alpha-matte generation for digital image matting," 2013 Sixth International Conference on Contemporary Computing (IC3), Noida, 2013, pp. 202-208, doi: 10.1109/IC3.2013.6612190. (Year: 2013).*

* cited by examiner

*Primary Examiner* — Brenda C Bernardi
(74) *Attorney, Agent, or Firm* — SoCal IP Law Group LLP; Jonathan Pearce (57) ABSTRACT

A system for calculating a consensus foreground object, relative to a background within a series of video frames is disclosed. The system relies upon a multi-prong approach that takes a consensus selection for the foreground object reliant upon at least three different models, then outputs the foreground object for application of alpha matting for use in augmented realty or virtual reality filmmaking.

19 Claims, 5 Drawing Sheets

FULLY AUTOMATED ALPHA MATTING FOR VIRTUAL REALITY SYSTEMS

RELATED APPLICATION INFORMATION

This patent claims priority from U.S. provisional patent application No. 62/623,088 entitled "FULLY AUTOMATED ALPHA MATTING METHOD FOR VIRTUAL REALITY SYSTEMS" filed Jan. 29, 2018, the entirety of which is incorporated by reference.

This patent also claims priority from U.S. provisional patent application No. 62/797,809 entitled "AUTOMATIC FOREGROUND EXTRACTION USING MULTI-AGENT CONSENSUS EQUILIBRIUM" filed Jan. 28, 2019, the entirety of which is incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates generally to methods for segmenting foreground objects from background images in videos, and, more particularly, to alpha matting methods that do not require human operation during the process of segmentation.

Description of the Related Art

Alpha matting is a computer vision technique which extracts the foreground object from the background scene with high precision opacity along the object boundary. For purposes of six degree of freedom filming, the associated video often has one or more foreground objects, as well as background objects. As described in some pending patent applications by the same applicant here, the identification of foreground objects enables these six degrees of freedom filming systems to more quickly identify objects for which three-dimensional models should be created, objects for which a two-dimensional model should be created, and mere background, which may be represented by a 360 degree sphere at a large draw distance. Such a system is described in pending patent application Ser. No. 15/495,863 with the title "Live Action Volumetric Video Compression/Decompression and Playback" filed Apr. 24, 2017, the entirety of which is incorporated by reference.

In particular, the alpha mattes may be used by six degree of freedom filmmakers to identify foreground objects and to streamline the process of modelling those objects. Automatically generating an alpha matte is a problem unique to computers because human brains are quite adept at differentiating between background and foreground in an image. In a still image or frame of video, human experience enables the human brain to detect which objects are "connected" to which objects and their relative depths, even though the image itself is completely lacking in depth. For example, a human can tell that an image of a person has a face, eyes, a nose, and that hair surrounding the face is that person's hair, and likely at the same depth, relative to the camera, as the person's face (or nearly the same). Likewise, faces are not generally floating in mid-air, they are attached to necks, and torsos, there may be arms nearby. All of this the human mind performs without thought, thereby separating the "human" foreground object from the background, no matter if that background is a single color, the sky, or a "busy" field of flowers and trees. The human is not fooled into thinking the trees are somehow a part of the person, just because they appear in a single image.

In contrast, a computer merely sees a series of pixels all at the same "depth" relative to one another, and each of a particular color (e.g. RGB encoding). Training computers to "segment" foreground and background objects as separate one from another has been a research topic for nearly thirty years. There are numerous approaches. The most modern approaches rely, at least in part, upon teaching a neural network to identify certain types of objects, so that they may be picked out. Such approaches, so far, have not yet led to a high-quality method for detecting foreground objects of unknown type, shape, and coloration. Those types of approaches are much more suited to known types (e.g. the foreground object will always be a human, or always be a fire truck, or always be a bicycle) than to irregular objects.

Other approaches rely upon human input of so-called "trimaps". A trimap is a human-created version of a still image or frame of video that has already had a foreground object or background identified. The trimaps generally are in the form of a separate image of the same size and shape, but with in black and white, with black (or dark colors) for the background and white for the foreground object. Trimaps are extremely useful for generating alpha mattes because if the foreground object is identified in white, then the trimap may, effectively, be overlaid on top of the still or frame of video with all black portions simply being deleted or alpha matted into transparency from the original image. Then, all that remains is the foreground object, with an alpha matte background. Practically speaking, the foreground object may then be overlaid on any background with the alpha matte portion being generally transparent and shifting according to the background applied behind the foreground object. The applicant here generally uses this in the context of six degree of freedom filmmaking to have foreground objects with background visible behind those objects. However, many other uses are possible, including merely altering the background in a still image or ongoing video (e.g., a video chat) in essentially real-time.

Different from existing alpha matting algorithms which assume trimaps or scribbles, the present method is a fully automated method without requiring any human intervention. A fully-automated alpha matting has two advantages compared to prior art methods.

First, drawing trimaps by human operators is generally infeasible given the large volume of images in a typical six degree of freedom video (e.g. 360 video). There is commercially available software to speed up the process, but in many cases professional artists still need to provide inputs to each frame individually. Second, trimap generation algorithms exist but many of them generate false or noticeably imperfect labeling of foreground and background. When a trimap contains false labels, the resulting alpha matting algorithm will misinterpret the foreground and background colors and generate incorrect results.

Existing alpha matting methods are generally classified as sampling-based or propagation-based. Propagation-based methods rely on the assumption that there is a smooth transition between the foreground and the background, and solve the matting problem by identifying them. Methods like closed form matting come under this purview. The other kind of methods are parametric and nonparametric sampling. Some previous non-parametric methods work by randomly selecting foreground and background samples which effectively represent the entire image with their weighted sum or some variation thereof. Parametric methods try to estimate color distribution parameters by randomly picking a window of pixels, calculating their distribution, and solving the matting problem using this calculated distribution. Still other methods are a hybrid of the above approaches and use traditional energy minimization techniques for the samples and propagation terms as smoothness in order to bypass the limitations of both.

Extensions of standard alpha matting to video matting are available but trimaps are still needed for these algorithms, which could become intractable when the video is more than a few minutes long. Alternative methods identify key frames of the video and propagate the user labeled alpha mattes to adjacent frames. However, the automated propagation is quite error-prone especially in the case of occlusion (e.g. a foreground object walks behind another foreground object, or a foreground object moves toward the camera such that less and less of it is visible in successive video frames). Most importantly, none of these methods is fully automated. Users need to interrupt the process to correct errors in the estimate, to provide input to identify the key frames, or to merely correct the erroneous alpha mattes. Other methods still apply sampling techniques to the video tensors as opposed to just images.

There are other matting algorithms which specialize in certain tasks like shadow removal, transparent object matting, and haze removal; but they do not generalize well to the alpha matting problem even though they perform well for their specific applications.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
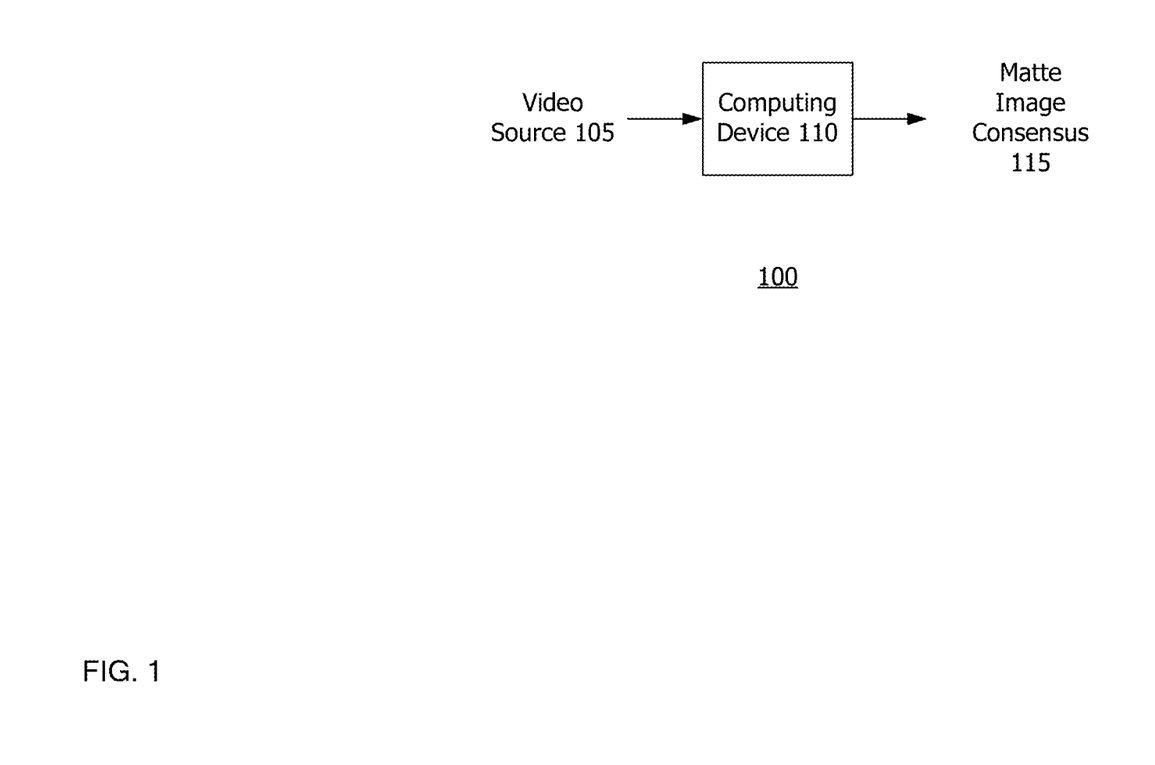
FIG. 1 is a block diagram overview of a system for fully automated alpha matting of video.

Referring now to FIG. 1 is block diagram overview of a system 100 for fully automated alpha matting of video. The system 100 includes a video source 105, a computing device 110, and a matte image consensus 115.

The video source 105 is a source of a frame-by-frame video file in digital form. Theoretically, the video could be a single frame, but more likely, it will be a series of frames, at a rate of at least 24 frames per second, that make up a full video. The video may be a traditional format video (e.g. single-screen, 4×3, 16×9, or 16×10 aspect ratios), a 360 degree video (e.g. a bubble of stitched live frame-by-frame images that make up a movie), or a six degree of freedom video in which a user can move about within a 360 degree environment with foreground objects having depth and three-dimensional characteristics within a certain viewing range. Whatever the source, the video includes digital images captured by a camera.

The computing device 110 is most likely a desktop computer. However, the computing device 110 may be a laptop, a server computer, a mobile device (e.g. a smartphone or tablet computer), or a smartwatch. Virtually any computing device 110 including a processor and memory may be capable of performing the functions described herein. Some types of computing device 110 may be better-suited to the functions described herein than others. Some of the algorithms used may be best suited to computers with discrete graphics processors.

Finally, the matte image consensus 115 is a consensus for which portions of the input video from the video source 105 are foreground objects and which are background. This matte image consensus 115 is preferably a consensus on a frame-by-frame basis. Each frame of video typically includes movement of both the background and foreground objects. So, each frame must be analyzed, and a consensus must be reached independently. The matte image consensus 115 enables subsequent video editor software to automatically apply alpha transparency to non-foreground objects to remove them from the visible frame, and to separate them from the background, for example, in the process of creating six degree of freedom video.

Figure 2:
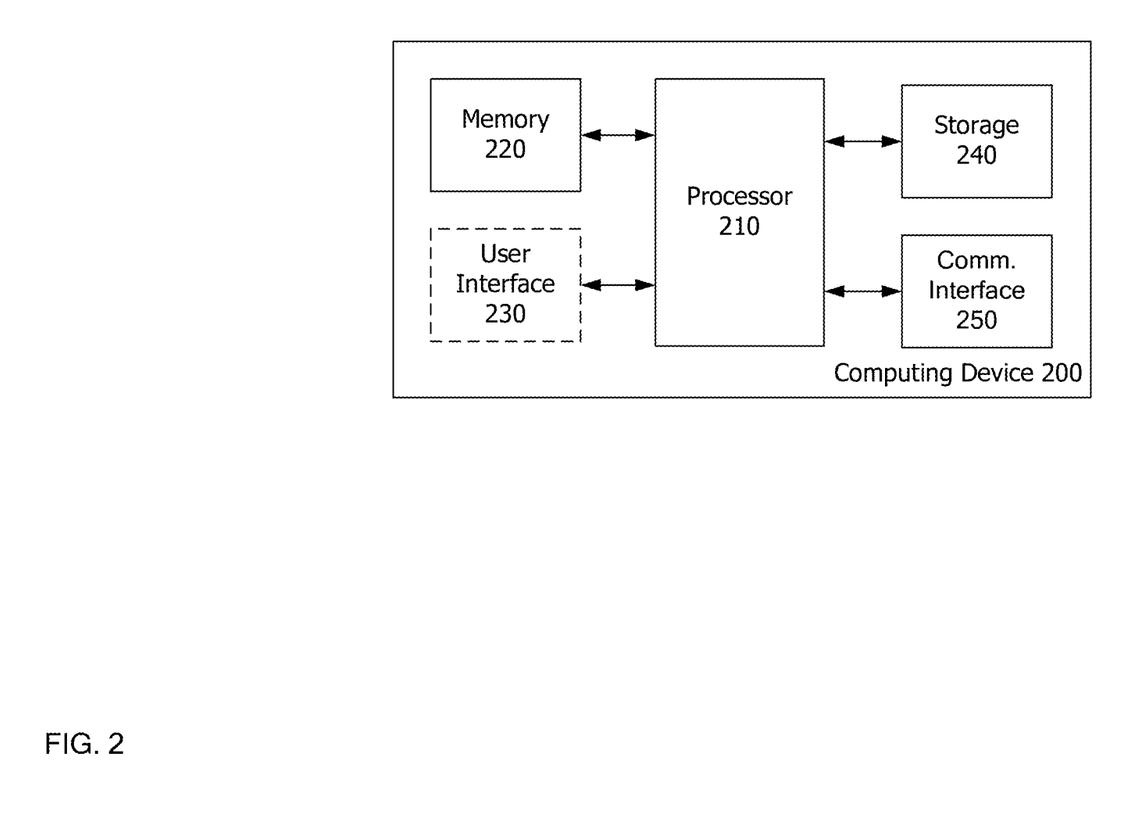
FIG. 2 is a block diagram of a computing device.

Turning now to FIG. 2, is a block diagram of an exemplary computing device 200, which may be the computing device 110 of FIG. 1. As shown in FIG. 2, the computing device 200 includes a processor 210, memory 220, optionally, a user interface 230, along with storage 240, and a communications interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the communications interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The user interface 230, if present, may include a display and one or more input devices such as a touch screen, keypad, keyboard, stylus or other input devices.

Storage 240 may be or include non-volatile memory such as hard disk drives, flash memory devices designed for long-term storage, writable media, and proprietary storage media, such as media designed for long-term storage of photographic or video data. The word "storage", as used herein, explicitly excludes propagating waveforms and transitory signals.

The communications interface 250 may include one or more wired interfaces (e.g. a universal serial bus (USB), high definition multimedia interface (HDMI)), one or more connectors for storage devices such as hard disk drives, flash drives, or proprietary storage solutions. The communications interface 250 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 250 may include radio-frequency circuits, analog circuits, digital circuits, one or more antennas, and other hardware, firmware, and software necessary for communicating with external devices. The communications interface 250 may include one or more specialized processors to perform functions such as coding/decoding, compression/decompression, and encryption/decryption as necessary for communicating with external devices using selected communications protocols. The communications interface 250 may rely on the processor 210 to perform some or all of these function in whole or in part.

As discussed above, the computing device 200 may be configured to perform geo-location, which is to say to determine its own location. Geo-location may be performed by a component of the computing device 200 itself or through interaction with an external device suitable for such a purpose. Geo-location may be performed, for example, using a Global Positioning System (GPS) receiver or by some other method.

Figure 3:
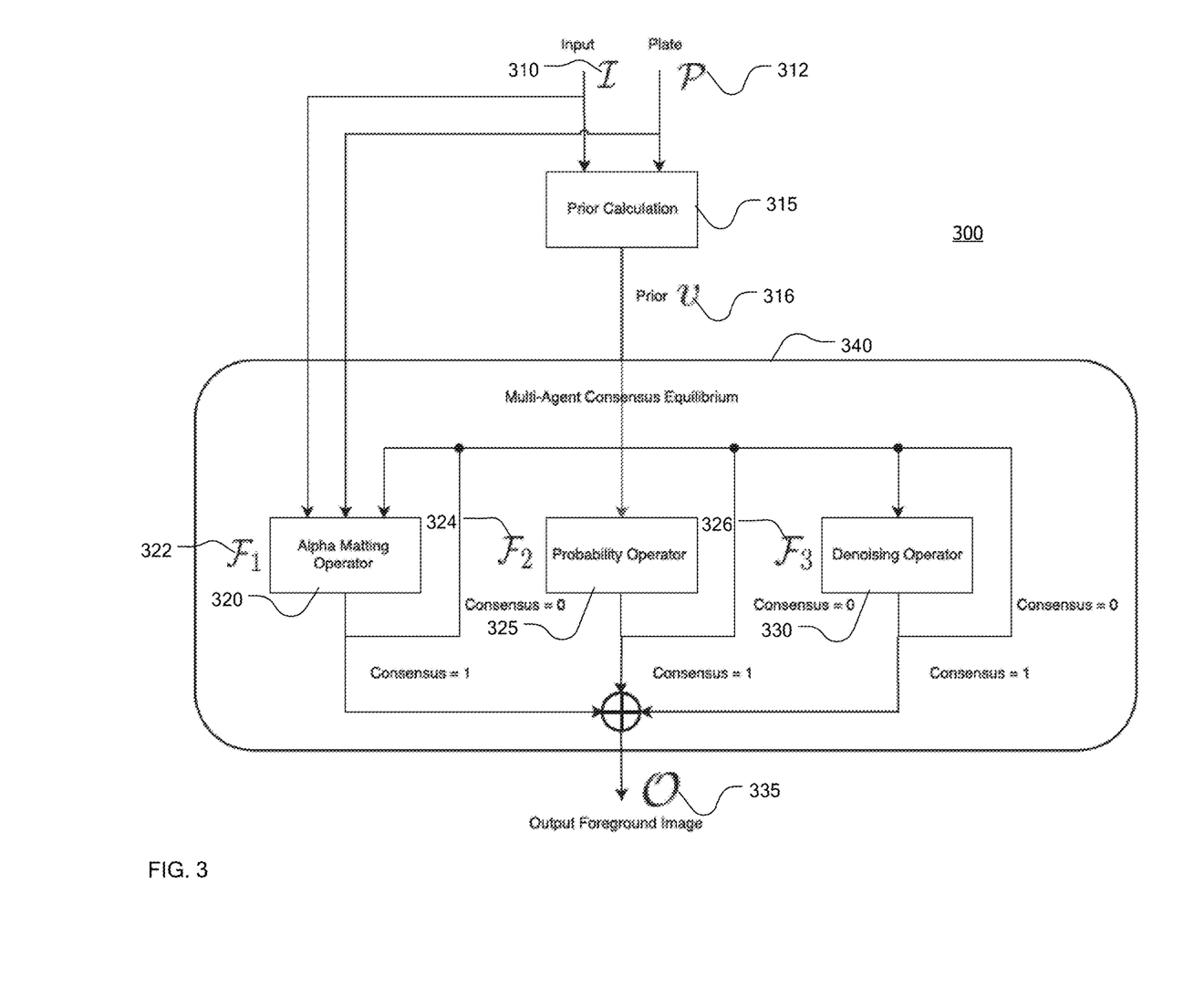
FIG. 3 is a functional block diagram of a system for fully automated alpha matting of video.

FIG. 3 is a functional block diagram of a system 300 for fully automated alpha matting of video. The system 300 has a dual-layer input. The dual-layers are a target color image 310 and a plate image 312. The target color image 310 is preferably color because the system 300 operates much more accurately upon color images. However, the image may in some cases not be color, but merely greyscale. The plate image 312 is the same image as the target color image 310, but without the foreground object. The plate image 312 may be captured before shooting begins, after shooting begins, or may be composited by a human after shooting has ended from other video portions. In particular in six degrees of freedom filmmaking, the camera rig (made up of many cameras) is often left in one position for much or all of a scene, so providing these plate images for each shooting location is a relatively limited task.

Though described as a dual-layer image, the target color image 310 and plate image 312 may be separate images (e.g. separate digital image files). However, they are identified to the system 300 as a target color image and a plate image that correspond to one another. A dual-layer image (an image with multiple layers of exactly the same size) is a simple and space-efficient way to transmit and store the target color image 310 and the plate image 312.

The dual-layer input image is provided to the prior calculation 315, the alpha matting operator 320, the probability operator 325, and the denoising operator 330. Each of these operators 320, 325, 330, apply their individual functions $\mathcal{F}1$ 322, $\mathcal{F}2$ 324, and $\mathcal{F}3$ 326, respectively, to reach the consensus foreground image output $\mathcal{O}$ 335.

Each of the operators 320, 325, and 330 perform different operations that are a larger part of a multi-agent consensus equilibrium (MACE) 340. The concept of MACE is, broadly, to apply multiple systems to solve the same problem, then face those systems off against one another to reach a consensus. In this application, the consensus is either an average (e.g. there are three operators 320, 325, and 330, so whether or not a given pixel is a foreground object or a background will always have 2 or more "votes") or a probability. Here, only one of the operators 320, 325, and 330 has any probability quantification, so probability cannot exclusively be used by each operator. However, the operators 320, 325, and 330 were chosen intentionally to complement one another within the MACE.

The prior calculation 315 generates a prior v 316 result. The prior calculation 315 is representative of one of the known techniques for generating alpha matting. These can be closed form mating, parametric sampling, or non-parametric sampling. Also, this prior calculation 315 may be some combination of these three methods in a hybrid form. The resulting output of these functions is an indication that one pixel either is or is not a background or foreground object. Because these methods are traditionally used alone, their output is not tailored to use in a consensus model. Specifically, their output is an indication that each pixel is a background or a foreground object, which does not account for edge cases where a determination was made, but the system was unsure.

To account for this, the probability operator 325 applies a probability model for each pixel to penalize pixel deviation (deviations from a determination that a given pixel is or is not a foreground object, for example) from the results derived from the alpha matting operator 320 and the denoising operator 330. The equation used is $F_2$:

$$F_2(z) = \underset{v}{\operatorname{argmin}} \|v - r_0\|^2 + \lambda_2 \|v - z\|^2,$$

where $r_0$ is a predetermined background probability estimate and $\lambda_2$ is a constant. $r_0$ is tuned so as to draw a stark a contrast between likely background and likely foreground objects, and relies upon a comparison of the plate image to the target color image on a pixel-by-pixel basis.

To do this, first, the color distance for each pixel between the target color image and the plate image is calculated. If the distance is larger than a predetermined threshold (or a calculated threshold, based upon the overall color variation in the target color image), then it is more likely that that particular pixel is a foreground object. Operator 325 is particularly good at correcting foreground object regions that were misidentified as background.

A weighting system may be used that is cognizant of the surrounding pixels' color distance as well. If a single pixel nearby is almost certainly a foreground object, but the remaining surrounding pixels (e.g. the six other pixels nearest the single pixel) are all background objects, then it is likely that this pixel is a part of the background. A probability likelihood may be calculated using a probability matrix for the pixel in question. That matrix may also consider the types of nearby pixels. If all or almost all surrounding pixels are foreground, then it is highly probable that the pixel in question is also a foreground object. This probability may be quantified. As a part of the process of reaching consensus (discussed below), this probability may be taken into account.

The alpha matting operator 320 is designed to estimate the foreground object vis-à-vis the background, while taking into account the consensus of the overall MACE. $F_1$ is defined as:

$$F_1(z) = \arg\min_v v^T \tilde{L} v + \lambda_1 (v-z)^T \tilde{D} (v-z),$$

where $\tilde{L}$ and $\tilde{D}$ are matrices and $\lambda_1$ is a parameter. The two matrices are Laplacian matrices generated using the color and the plate image, respectively. The plate image matrix takes the place of the trimap. An energy function may consist of a data term and a penalty term. The data term is based upon the two matrices, the penalty term accepts feedback about a given pixel from the overall MACE operation. In contrast to existing systems, a diagonal matrix based upon the plate image is used to apply the penalty, rather than a trimap. In this way, a trimap need not be used.

The denoising operator 330 relies upon $F_3$ which is:

$$F_3(z) = \arg\min \|v\|_{TV} + \lambda_3 \|v-z\|^2,$$

where $\lambda_3$ is a parameter. Here, the intention is to smooth the total variation in color across the entire target color image. Though an entire target color image may be compared to calculate the total variation (e.g. the numerically darkest pixel to lightest pixel). Predecessor and subsequent frames of video in the present implementation may also be taken into account so as to minimize the variation over a broader spectrum of time and color. The total variation being minimized is the sum of the horizontal and vertical gradients (e.g. top to bottom, and left to right, separately from one another). This denoising smooths edge pixels and rents to result in fewer "choppy" edges along a foreground object. Thus, the denoising can have the effect, within the MACE, of flipping pixels that are potentially foreground objects, but that would stand out relative to other edge pixels. The denoising smooths those edges, when applied within the construct of the MACE.

Finally, the consensus is reached using the MACE 340. The consensus is the average for every pixel in the target color image (e.g. as a matrix). The consensus gathering mechanism contains a pair of equations:

$$\mathcal{F}(z) = \begin{bmatrix} F_1(z_1) \\ \vdots \\ F_N(z_N) \end{bmatrix}, \text{ and } \mathcal{G}(z) = \begin{bmatrix} \langle z \rangle \\ \vdots \\ \langle z \rangle \end{bmatrix}, \quad \text{Equation 1}$$

The individual functions $F_i$ are defined as the agents of the Equation 1. The agents take the inputs and compute individual outputs. The consensus operation $\mathcal{G}$ takes a set of inputs and computes their average. The averages are then broadcast to the individual agents for updates through convergence. The update equation is given by Equation 2:

$$\underline{v}^{(k+1)} = (2\mathcal{G} - \mathcal{I})(2\mathcal{F} - \mathcal{I})\underline{v}^{(k)}. \quad \text{Equation 2}$$

Equation 2 is iteratively applied until convergence. Convergence of the MACE 340 is only guaranteed if F is firmly non-expansive or at least locally firmly non-expansive, which occurs when the function used to generate $F_i$ is closed, proper, and convex. The functions $F_1$, $F_2$, and $F_3$ were chosen as being relatively "good" at being both different from one another in their results and approaches, but also complementary to one another in generating results that tend to conflict in the edge cases, quite literally in this application, the cases on the edge of a background or foreground object. They were also selected because none of them required user intervention as they operate or before they can operate, other than the plate image. These functions also generally operated quickly enough to move through a large video file in a reasonable amount of time, relative to the other operations that must take place during conversion of traditional video to six degrees of freedom video.

However, alternative functions may be chosen and used with the MACE 240. Additional functions may be chosen, and fewer functions may be chosen. The MACE 240 processes may be replicated using other algorithms to iteratively reach consensus. The component that is most relevant is the ability of each function to accept input from another function and/or to provide feedback to other functions so as to reach that iterative consensus.

In this way, the results of each other operator may be taken into account while reaching consensus. The three operators 320, 325, and 330 are discussed above.

That average is then output as the output foreground image 335.

Description of Processes

Figure 4:
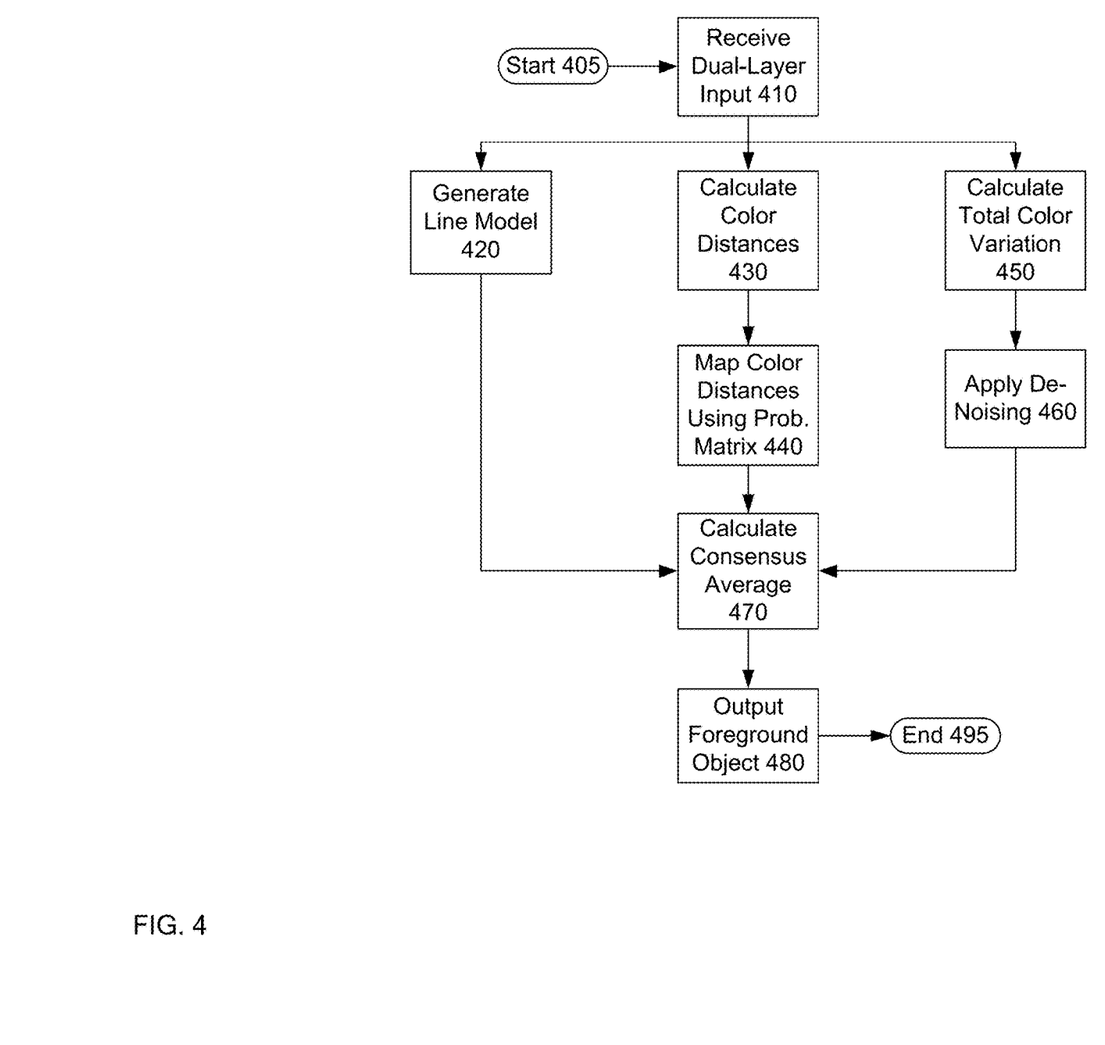
FIG. 4 is a flowchart of a process of fully automated alpha matting of video.

FIG. 4 is a flowchart of a process of fully automated alpha matting of video. The process begins at 405 and ends at 495, but may take place for many successive frames of video in rapid succession. One of the benefits of this system over prior art systems is that it can operate completely free of human interaction once initiated.

For a single frame of video, the first step is to receive a dual-layer input at 410. As indicated above, this may not be a dual-layer input, though that is the most efficient and convenient way to implement this system.

The next three operations occur substantially simultaneously. However, they will be discussed each in turn merely as a function of the process of describing this flowchart.

First, a line model is generated at 420. The line model is generated by the alpha matting operator 320, discussed above. The line model is effectively an outline of the foreground object, set against the background. The line model identifies the "edge" of the foreground object, and suggests this to the MACE system as the alpha matte.

The color distances between the target color image and the plate image are calculated at 430 by the probability operator 325 and are then mapped using a probability matrix at 440. This enables the color distances to be used to suggest whether each pixel may be more or less likely to be a foreground object or a background pixel. That probability may be fed back into the MACE as a consensus is reached.

Substantially simultaneously, the total color variation is calculated at 450 by the denoising operator 330. As indicated above, that total color variation is the sum of the horizontal and vertical gradient magnitudes (e.g. the greatest distance in color, both vertically and horizontally in the target color image). Then, denoising is applied so as to minimize the total color variation at 460. This has the effect of smoothing edges between the foreground object and background within the MACE.

Once each of those are determined, the consensus average may be calculated for each pixel at 470. Though the operators 320, 325, and 330 inform one another, each has an independent say in the overall consensus to reach an average. Then, whether a pixel is a part of a foreground object or a part of the background is output as a foreground object image at 480. Though that output may take many forms, it preferably appears as a traditional alpha matte that may be applied to the target color image. Traditionally, those alpha mattes are "white" in areas that are the foreground object to remain after alpha matting is applied, and "black" in areas where there is background that is to be removed through alpha matting. Other formats may be used.

The process then ends at 495.

Figure 5:
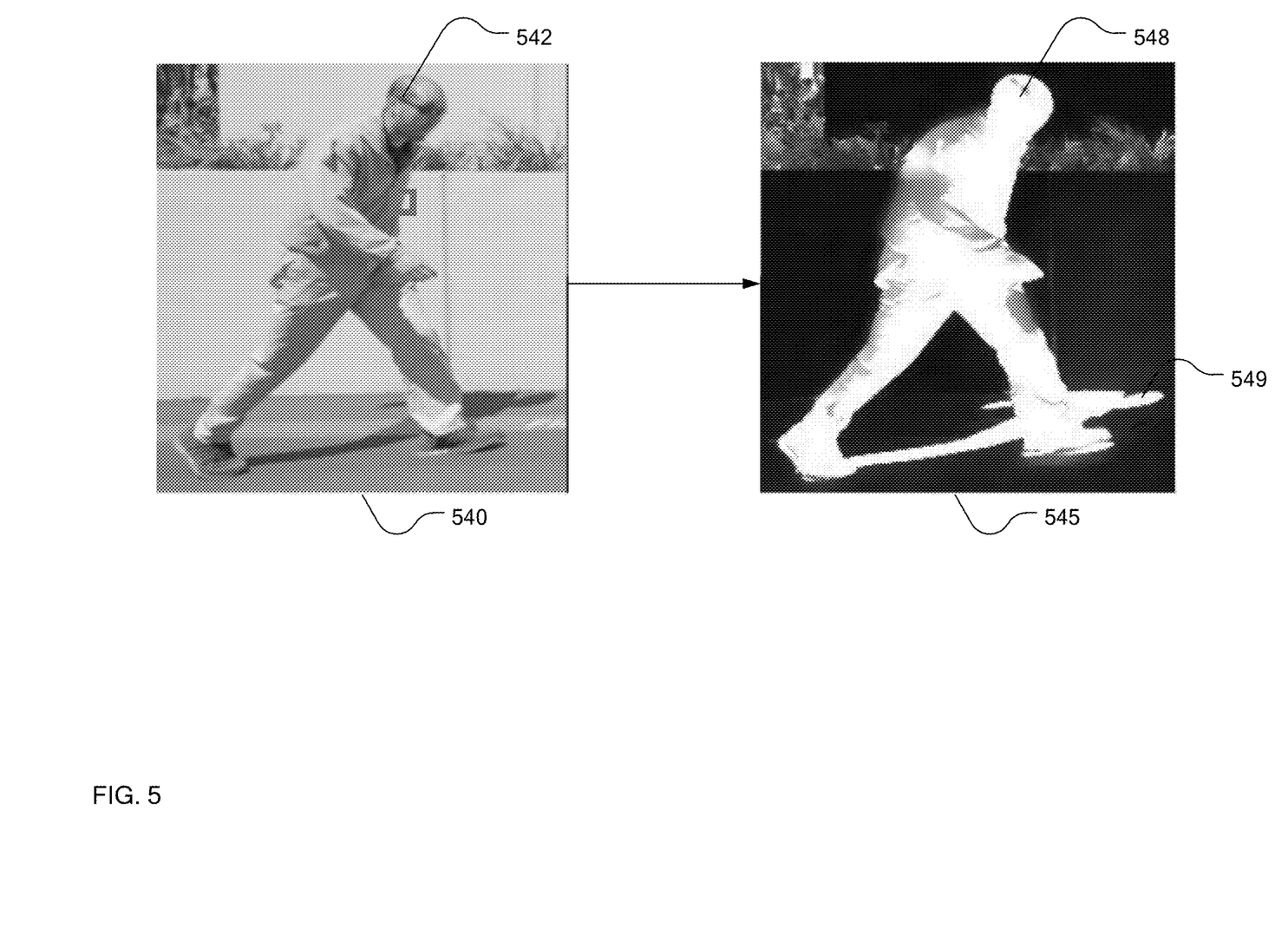
FIG. 5 is an example of an input frame of video and resulting alpha matted frame of video.

FIG. 5 is an example of an input frame of video 540 and resulting alpha matted frame of video. The input frame of video 540 is shown in black and white only for purposes of this patent. In most cases, the input frame of video 540 would be a color image, as discussed above. There is an individual 542 walking within the foreground of the input frame of video 540.

An alpha matted frame of video 545 which could be the output at 470 is also seen in FIG. 5. This output correctly identifies the individual 548 and a very good outline of that individual. The relative lightness or darkness of the alpha matte frame of video 545 indicates the degree of certainty the system has about whether the object is a foreground object (lighter) or background (darker). In particular, the individual 548's back area, which in the input frame of video 540 blends very well into the background wall, can be seen to be "hazy" (e.g. darker and blurry). That is because the line between the foreground object and the background is least discernable in that location. The present system correctly identified the back area, albeit hazily. Given that it is also hazy to the human eye, that is a very high-quality result. The same could be said about the area above the individual 548's left knee, which is similarly hazy, but well-defined in the resulting alpha matte.

The individual 548's shadow 549 was also correctly identified as a foreground object. While, the shadow is not technically a foreground object, it will be helpful in almost all cases to have this shadow 549 visible (i.e. not alpha matted out of the image), rather than invisible, within the alpha matted video frame.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for automatic alpha matting of video comprising a processor and associated memory, the memory storing instructions which when executed by a processor cause the processor to:
   receive a dual-layer image comprising a frame of video, the dual layer including a target image and a plate image including only a background of a matching frame for the target image;
   generate a line model, setting forth expected outer boundaries for a foreground object, reliant upon a comparison between the target image and the plate image;
   calculate, for each pixel in the target color image, a color distance between the target color image and the plate image;
   map the color distance for each pixel using a probability function to determine whether it likely that each pixel is a part of the foreground object or the background;
   calculate a color total variation for the target image, the total variation equaling the sum of both horizontal and vertical gradient deviation magnitudes for each pixel in the target image;
   apply denoising to smooth edge pixels to minimize the total variation;
   calculate a consensus foreground object as an average for each pixel in the target image from the line model, the probability that each pixel is a part of the foreground object or the background, and the minimized total variation; and
   output the consensus foreground object for the target image.

2. The system of claim 1 wherein the plate frame is captured before video filming begins.

3. The system of claim 1 wherein the line model is generated using a matting Laplacian matrix.

4. The system of claim 1 wherein mapping the color distance for each pixel comprises:
   identifying pixels known to be a part of the background and pixels known to be a part of the foreground object to thereby identify edge pixels; and
   for each of the edge pixels calculating a probability that the pixel is the foreground object or the background.

5. The system of claim 1 wherein the denoising relies upon a color of one of the edge pixels in at least one of a predecessor and successor frame of video to the frame of video.

6. The system of claim 1 wherein the denoising relies upon a pixel on at least one side of an edge pixel for which denoising is taking place.

7. The system of claim 1 where in the consensus foreground object for the frame of video influences the consensus in the following frame of video.

8. A method for alpha matting of video comprising:
   receiving a dual-layer image comprising a frame of video, the dual layer including a target image and a plate image including only a background of a matching frame for the target image;

generating a line model, setting forth expected outer boundaries for a foreground object, reliant upon a comparison between the target image and the plate image;

calculating, for each pixel in the target color image, a color distance between the target color image and the plate image;

mapping the color distance for each pixel using a probability function to determine whether it is likely that each pixel is a part of the foreground object or the background;

calculating a color total variation for the target color image, the total variation equaling the sum of both horizontal and vertical gradient deviation magnitudes for each pixel in the target image;

applying denoising to smooth edge pixels to minimize the total variation;

calculating a consensus foreground object as an average for each pixel in the target image from the line model, the probability that each pixel is a part of the foreground object or the background and the minimized total variation; and outputting the consensus foreground object for the target image.

9. The method of claim 8 wherein the plate frame is captured before video filming begins.

10. The method of claim 8 wherein the line model is generated using a matting Laplacian matrix.

11. The method of claim 8 wherein mapping the color distance for each pixel comprises:
identifying pixels known to be a part of the background and pixels known to be a part of the foreground object to thereby identify edge pixels; and
for each of the edge pixels calculating a probability that the pixel is the foreground object or the background.

12. The method of claim 8 wherein the denoising relies upon a color of one of the edge pixels in at least one of a predecessor and successor frame of video to the frame of video.

13. The method of claim 8 wherein the denoising relies upon a pixel on at least one side of an edge pixel for which denoising is taking place.

14. The method of claim 8 where in the consensus foreground object for the frame of video influences the consensus in the following frame of video.

15. A system for automatic alpha matting of video comprising a processor and associated memory, the memory storing instructions which when executed by a processor cause the processor to:
receive a frame of video including a target image in digital form;
activate a first model for operating upon the target image to identify a first set of likely foreground object pixels and likely background pixels;
activate a second model, distinct from the first model, for operating upon the target image to identify a second set of likely foreground object pixels and likely background pixels;
iteratively apply a multi-agent consensus equilibrium algorithm to cause the first set of likely foreground object pixels and likely background pixels to inform the second set of likely foreground object pixels and likely background pixels until a consensus set of likely foreground object pixels and likely background pixels is reached; and
output the consensus foreground object for the target image.

16. The system of claim 15 wherein the first model for operating upon the target image is an alpha matting operator reliant upon the target image and a plate image to reach the first set of likely foreground object pixels and likely background pixels.

17. The system of claim 15 wherein the second model for operating upon the target image is a probability operator that generates a probability matrix for the target image, the probability matrix identifying the likelihood that each pixel in the target image is a part of a foreground object or a part of a background.

18. The system of claim 15 wherein the first model for operating upon the target image is a denoising operator that performs edge smoothing for the edge between a foreground object and a background.

19. The system of claim 15 where in the instructions further cause the processor to:
activate a third model for operating upon the target image to identify a first set of likely foreground object pixels and likely background pixels; and
iteratively apply a multi-agent consensus equilibrium algorithm to cause each of the first set, the second set, and the third set to operate upon one another until a consensus set of likely foreground object pixels and likely background pixels is reached.

* * * * *